Figure 1:
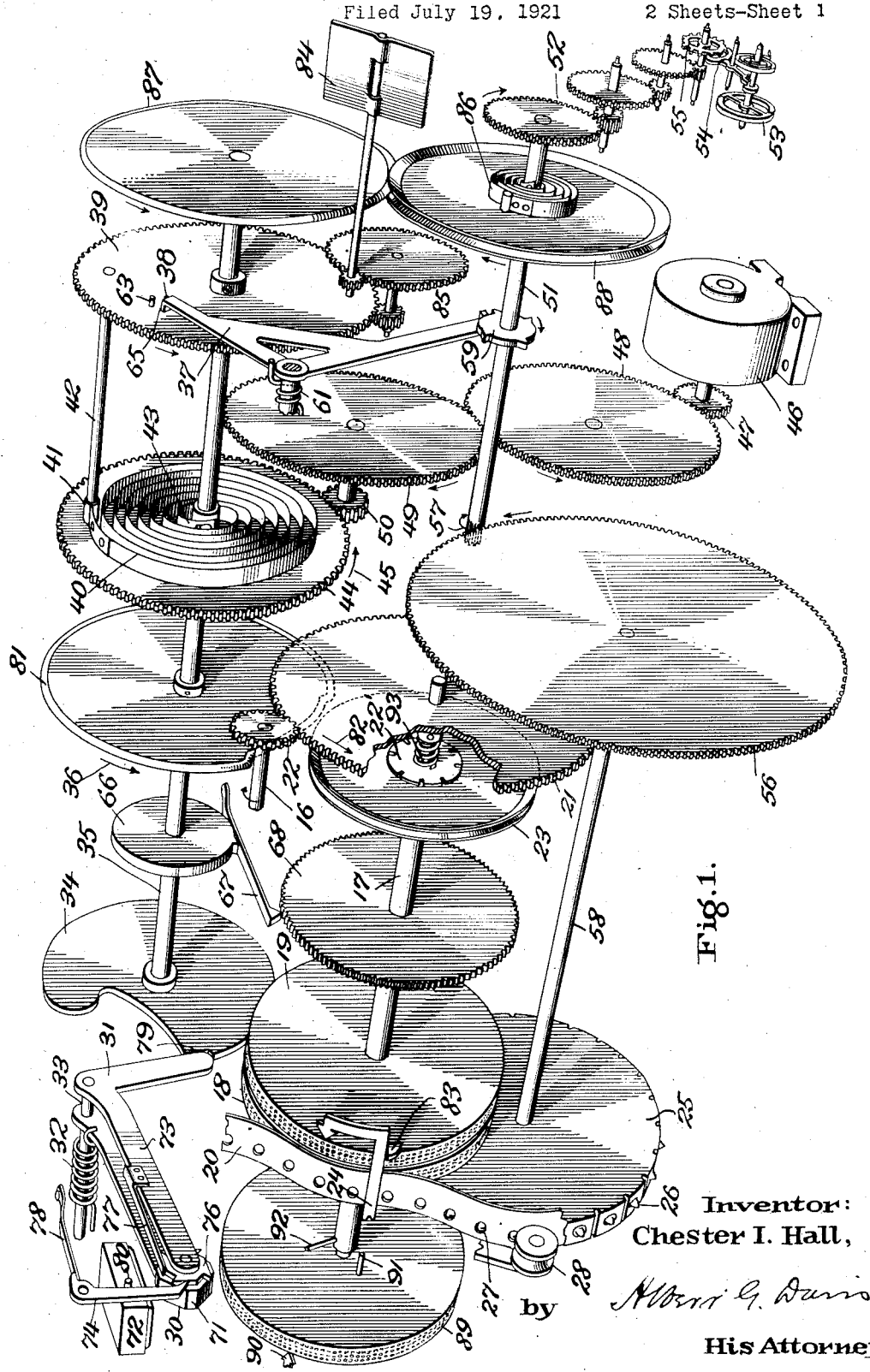

Feb. 12, 1924.

C. I. HALL

DEMAND METER

Filed July 19, 1921 — 2 Sheets-Sheet 1

1,483,432

Inventor:
Chester I. Hall,
by
His Attorney

Feb. 12, 1924. 1,483,432
C. I. HALL
DEMAND METER
Filed July 19, 1921 2 Sheets-Sheet 2

Inventor:
Chester I. Hall
by Albert G. Davis
His Attorney

Patented Feb. 12, 1924.

1,483,432

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

DEMAND METER.

Application filed July 19, 1921. Serial No. 486,006.

*To all whom it may concern:*

Be it known that I, CHESTER I. HALL, a citizen of the United States, residing at Fort Wayne, in the county of Allen, State of Indiana, have invented certain new and useful Improvements in Demand Meters, of which the following is a specification.

This invention relates to a demand meter, and more particularly, to a demand meter which is so arranged, that it records by printing the demand in electrical energy in a load circuit over definite intervals of time. When electrical energy is sold to a customer by the central station it is highly desirable to charge for the energy upon an equitable basis. Ordinarily where the load supplied to a customer is fairly uniform, the charges may be based on the actual consumption, but where the load taken is of a fluctuating character, or where it varies within wide limits throughout the day, a large demand by many such customers may cause an expensive overloading of the power station. This is due to the fact that there must be equipment sufficient to carry heavy loads, even if they are maintained for only a short period. For this reason it is quite customary for central stations to base their charges on the maximum demand of energy which the customer uses within equal short intervals of time, such as 15 or 30 minutes. Demand meters for indicating the maximum demand over equal intervals of time are well known. My present invention relates to this form of instrument in which the indications of the demand for equal intervals of time appear as a printed record. The printed record has great advantages over the ordinary pointer arrangement in that it is possible to determine at what time and day the maximum demand occurs, as well as the demand occurring in all of the other intervals. My invention is so arranged that the printing operation takes place after a predetermined period of time has elapsed, the indications printed being proportional to or in accordance with the movement of the movable member of the measuring instrument. The movable member of an instrument utilized in an electrical installation such as discussed herein is usually the shaft of a watthour meter, but it is evident that other types of meters may be substituted. In previous types of meters many complications in the structure are present due to the fact that many of the operations are performed by electromagnets energized intermittently. With my invention all contact-making apparatus is obviated and I perform the printing operation as well as all the other operations by purely mechanical means. Another object of my invention is to arrange matters in such a way that the intervals of time in which the energy expended is to be indicated are maintained accurate. Another object of my invention relates to the manner in which the ink is supplied to the elements which perform the printing. Other objects and advantages of my invention will become apparent as the description proceeds.

Figure 2:
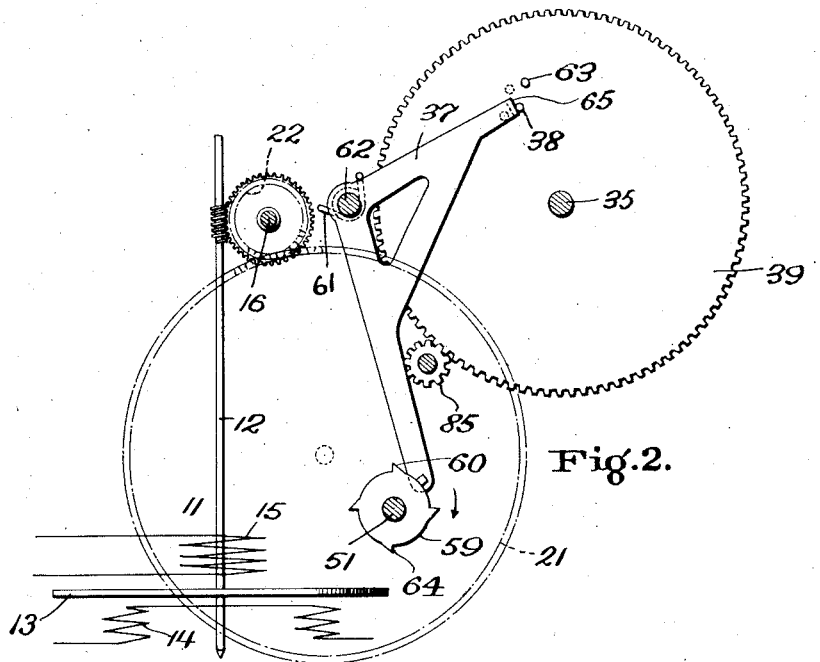
Figure 3:
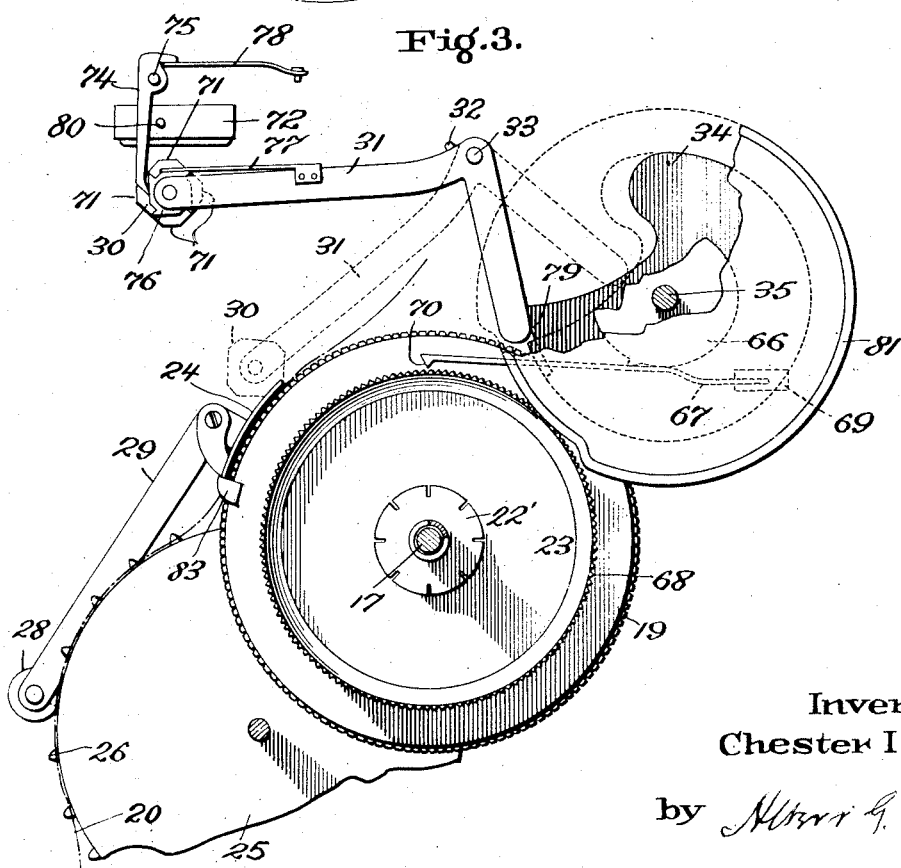

For a better understanding of my invention, reference is to be had to the specification together with the accompanying drawings in which Fig. 1 is a distorted perspective showing all of the operating elements of my device. This figure is diagrammatic and illustrates in a simple manner the correlation and cooperation of the parts making up the printing feature of the meter; Fig. 2 is a sectional view of the printing mechanism illustrating the manner of releasing the main shaft so as to allow it to make one revolution periodically, for example, once every 15 minutes; and Fig. 3 is another sectional view illustrating how the ink is supplied to the platen and how the platen is made to perform a printing operation on the tape or record sheet.

Referring now more in detail to the drawings, in which like reference characters refer to like parts throughout, I illustrate in the present instance an ordinary induction watthour meter 11 having a movable element or shaft 12. The movement of this element during equal intervals of time is to be recorded. The meter 11 comprises in addition to the shaft 12 a disc or armature 13 and the usual energizing coils 14 and 15. Since it is immaterial just what kind of an instrument is utilized, it is not considered necessary to describe in any greater detail the construction of this particular form of meter.

By suitable gearing the movement of the movable element of the instrument is transmitted to a shaft 16. This shaft is supported in any appropriate way so that it rotates without friction, as for example, by the aid of jewel bearings. Other means for causing the shaft 16 to be moved in accordance with the movement of the movable element 12 may be utilized. For example, it is possible to arrange matters in such a way that the load of driving the gears is not imposed upon the instrument in any way, if it is found that this load has an appreciable effect upon its accuracy.

Upon a shaft 17 likewise suitably supported in bearings, there are located a type carrier or wheel 18 and a sight wheel 19. On the periphery of these wheels are numbers indicating the extent of movement of the movable member 12. These numbers may represent directly the electrical energy expended in the circuit in which the meter is placed in units of watthours or kilowatt hours. The numbers on the type carrier wheel 18 are used for printing these numbers on the tape 20 which is led over the type carrier wheel 18. The wheel 19, however, is used merely for indicating by sight the amount of energy expended in the circuit from the time that the last printing operation was performed. The shaft 17 is arranged to be driven in accordance with the movement of shaft 16 as by means of gear 21 and pinion 22. The gear 21 is not rigidly mounted on the shaft 17 but is coupled thereto by means of a friction clutch comprising a spring member 22' and one surface of a wheel 23. A spring 93 is utilized to keep the friction surfaces in engagement. A stationary pointer 24 locates the number on the sight wheel 19 which would be printed if the printing operation would occur at that time. The friction clutch is introduced in the drive so that the type wheel 18 and the sight wheel 19 may be returned periodically to their zero positions after each printing operation without reversing the movement of the gear 21 and shaft 16.

The tape 20 upon which the printing is performed is moved in the present instance downward as shown by the arrow thereon by means of a sprocket wheel 25 driven at a constant speed. The projections 26 of this wheel engages apertures 27 in the tape 20 for moving this tape. To keep the tape in driving relation with respect to the wheel 25 appropriate means such as a roller 28 carried by a weighted and pivoted arm 29 is utilized.

A platen 30 carried by a pivoted lever 31 is arranged periodically to engage the tape 20 and press it between certain of the types on wheel 18 and one of the inked surfaces 71 of the platen. During this operation the platen 30 and pivoted arm 31 are in the dotted line position of Fig. 3. The arm 31 is constantly urged toward the type wheel 18 as by means of a spring 32 coiled about the shaft 33 on which the lever 31 is pivoted, in the manner clearly shown in Fig. 1. This spring is allowed to act and to urge the platen 30 against the type wheel 18 periodically by mechanical means, such as the cam 34. The mechanism whereby this cam is periodically actuated will now be described.

I provide a main operating shaft 35 suitably supported in bearings, which shaft carries the cam 34 as well as certain other elements for performing other necessary operations, such as for returning the type wheel 18 and the sight wheel 19 to their zero positions. This shaft is constantly urged for rotation in the direction shown by the arrow 36 but is prevented from turning, except when the printing operation is to be performed, by a detent lever 37 which cooperates with a pin 38 carried on a gear 39 rigidly connected to the shaft 35, see particularly Fig. 2. The means for urging the shaft 35 in the direction shown by the arrow 36 comprises a spring member 40. The outer end 41 of the spring is firmly connected to a post 42, shown in Fig. 1 as greatly elongated to illustrate as clearly as possible the mechanical construction of the device. This post 42 is carried by gear 39. The inner end 43 of the spring 40 is mechanically connected to a gear 44 which is loosely mounted on the shaft 35, and which is rotated in the direction shown by the arrow 45 so as to keep the spring 40 always wound. The motive power for keeping the spring wound may comprise any appropriate means. In the present instance I supply an electric motor 46 arranged to be constantly energized and connected with the gear 44 as by gears 47, 48, 49 and 50.

I arrange means for allowing the shaft 35 to make one complete revolution periodically by raising the detent 37 once every 15 or 30 minutes or any other interval of time during which the demand is to be measured. This mechanism for raising the detent may comprise any ordinary clock mechanism; in the present instance a shaft 51 is driven at constant speed by means of the ordinary marine clock escapement 52. This clock escapement comprises the balance wheel 53, the verge 54, and the escapement wheel 55 appropriately geared to the shaft 51. In the present instance, the shaft 51 also serves to actuate the sprocket wheel 25 referred to hereinbefore, as by means of the gears 56 and 57 and shaft 58. The detent lever 37 is arranged to be lifted out of the path of the post 38 by means of the cam 59 carried on the shaft 51. This cam may have as many active portions 60 as desired so as to cause the detent to be raised once for any predetermined interval of time. If the shaft 51 is the hour shaft of the clock 52, then in the particular device illustrated in the drawings the cam 59 is active once every 15 minutes to operate the detent 37. The coil spring 61 is arranged on the shaft 62 upon which the detent lever 37 is pivoted. for urging this detent against the cam 59. When, however, one of the active portions 60 of the cam 59 raises the detent lever out of the path of movement of the post 38, the shaft 35 is allowed to rotate a very slight extent until another post 63 carried by gear 39 comes into engagement with the detent 37, as is clearly indicated in Fig. 2. Then as the straight portion 64 of the cam 59 passes under the detent, the detent is again allowed to drop, but this time the post 38 has passed the operative portion 65 of the detent lever 37 and the shaft 35 is free to rotate further until the post 38 is carried around until it engages again the operating portion 65 of the detent lever 37. It is thus evident that once every 15 minutes the shaft 35 makes a complete revolution.

The revolution of the shaft 35 is made use of first of all to center the type wheel 18. If this were not done, then there would be no assurance that a set of type numbers on the periphery of wheel 18 will come directly under the operative surface of the platen 32 as it performs the printing operation. For centering the type therefore appropriate means is utilized, which in the present instance consists of the cam 66 connected to shaft 35, a detent or pawl 67, and toothed wheel 68 carried on shaft 17. The detent or pawl 67 is supported at one end in a stationary post 69 and is appropriately made of resilient material so that its free end 70 may be bent down into engagement with the teeth of the toothed wheel 68. The pitch of the teeth on wheel 68 is made equal to the pitch of the type carried on the type wheel 18, and when the detent 67 is depressed by the cam 66 at the beginning of the rotation of shaft 35 the free end 70 enters into engagement with the teeth and may cause a slight rotation of shaft 17 in one direction or the other just sufficient to center the type on wheel 18. This slight rotation is made possible by the slipping connections 22', 23 described heretofore. After the type is centered the cam 34 allows the lever 31 to be urged into the dotted line position shown in Fig. 3, by means of the spring 32. The operative surface 71 of the platen 30 has been inked previously by the inking pad 72, appropriately supported on a stationary part of the mechanism. Further rotation of the shaft 35 causes further actuation of cam 34 so as to rotate the lever 31 backward against the action of the spring 32.

The inking pad 72 is so arranged that it inks the operative surfaces 71 of the platen 30 successively after each printing operation. For effecting this result the platen 30 is made rotatable between the forks 73 of the pivoted lever 31. A pawl 74 pivoted on a stationary shaft 75 coacts with a ratchet wheel 76 which is rotated a small amount such as a quarter of a revolution by the pawl 74 every time a printing operation is completed, and which is mechanically connected to platen 30. The high part of the cam 34 is made high enough so that it not only returns the pivoted lever 31 to the full line position but causes this lever to rotate a slightly greater amount and to cause one of the surfaces 71 to be pressed against the inking pad 72. Prior to this time, however, the ratchet wheel 76 and therefore the platen 30 has been turned by a quarter of a revolution so that a new surface 71 is presented to the pad 72. In order to make sure that the platen 30 rotates exactly a quarter of a revolution, a spring member 77 having a flat surface cooperating with the flat surface of the teeth of the ratchet wheel as clearly shown in Fig. 3 is located on lever 31. Furthermore, the pawl 74 is urged into engagement with the teeth on this ratchet wheel by means of another resilient member 78. After the surface 71 has been brought into engagement with the inking pad 72 it is allowed to drop back a slight amount by the cam 34, which has a stepped portion 79 for permitting this slight rotation of the lever 31. In the arrangement shown one of the surfaces 71 is inked but is active only after a half hour has elapsed, or after two printing operations have been performed. In this way an opportunity is given for the ink to become dry on the operative surface 71, before it is used for printing, and smudging is prevented. A stationary post 80 is arranged to limit the movement of the pawl 74 so that when the arm 31 is rotated to perform the printing operation this post 80 contacts with the pawl 74 and keeps it in such a position that it cooperates with the teeth of the ratchet wheel 76 upon the return of the lever 31.

After the printing operation is performed I arrange means actuated by shaft 35 for returning type wheel 18 and the sight wheel 19 to their zero position. This is effected by a friction drive coupling comprising a mutilated friction gear 81 rigidly connected to shaft 35 and arranged to coact with the friction gear wheel 23 rigidly connected to the shaft 17. The mutilated portion of gear 81 is so located that the returning operation does not begin until after the printing operation is completed. The return to zero is made possible due to the slipping connection in the drive from the movable element 12 of the meter to the shaft 17. Thus while the actuation of the shaft 17 due to the action of shaft 16 is in the direction shown by arrow 82 located on gear 21, the actuation of shaft 17 due to the movement of shaft 35 and to the engagement of wheels 23 and 81 is in the reverse direction. The gearing 23 and 81 is so arranged that it can if need arises rotate the wheels 18 and 19 backward for a complete revolution. To bring these wheels to a stop, however, at the zero point I provide a projection 83 arranged to coact with the member 24. After contact is made between this projection 83 and the part 24 the gear 81 simply slips on the gear 23 and there is no further movement of the wheels 18 and 19.

In order to prevent too rapid rotation of the shaft 35 when it is released, use is made of any appropriate means such as a fly 84 geared as by gearing 85 to rotate at a high speed. This rotation of the fly 84 causes sufficient air damping to limit the speed of the shaft 36.

The rotation of the shaft 35 performs in addition to the printing operation the operation of winding up the spring 86 of the clock movement 52. This is done by means of the friction gears 87 and 88 which are connected respectively to the main operating shaft 35 and to the outer end of the spring 86. The inner end of the spring 86 is fastened to the clock shaft 51. Over-winding of the spring 86 is prevented due to the slipping nature of the drive between gears 87 and 88, since in this way only a portion of the movement of gear 87 is made use of, the remainder of the movement being taken up in slippage between the gear surfaces. In this way the constant speed mechanism is made self-winding and no particular attention need be paid to it, and its time-keeping qualities are maintained for long periods of time.

I provide an arrangement whereby another indication of the maximum demand is obtained by means of a frictionally mounted sight wheel 89 so arranged that it will set in any position into which it has been rotated. This is the ordinary arrangement utilized for maximum demand pointers. In the present instance, however, the numbers on the periphery of wheel 89 coact with a stationary pointer 90 to indicate its maximum movement and thus the maximum movement of the movable member 12 of the instrument. To move the wheel 89 in accordance with the maximum movement of the meter, I provide cooperating posts 91 and 92, the post 91 being carried by the wheel 89 and the post 92 being so arranged on the shaft 17 that it engages the post 91 if the movement of the shaft 17 is greater than any of its previous movements. When the wheels 18 and 19 are returned to their zero position the wheel 89 remains in the position to which it was rotated, and serves to indicate the maximum of all the numbers printed on the tape 20.

This indication is useful since it gives the value which must be looked for on the tape 20 as the maximum registration of the instrument. Thus the instrument as now completely described is arranged to produce a record showing the greatest movement of the member 12 on the wheel 89, the demand for every 15 minutes on tape 20, and the time when the demand occurred on the tape 20, as well as the demand which has taken place since the last printing operation, on wheel 19.

The operation of the device is apparent from the foregoing description. The clock movement 52 actuates the tape 20 and also the cam 59. Once every 15 minutes the detent 37 is rocked and the main operating shaft 35 makes a complete revolution. The spring 40 thus unwinds a small amount but it is constantly being wound by means of the constantly energized motor 46. The shaft 35 in rotating centers the type on shaft 18 by means of cam 66, detent 67 and wheel 68. After the type is centered further rotation of the shaft permits the lever 31 to bring the platen 30 into contact with the tape 20 to perform the printing operation. Then simultaneously the lever 31 is rotated backwardly and the wheel 81 engages with the wheel 23 to return the type wheel 18 and the sight wheel 19 to their zero position. At the same time the clock spring 86 has been wound and an inking operation has been performed upon one of the active surfaces of the platen 30 by means of the inking pad 72. The return of the wheels 18, 19 to the zero position does not interfere with the actuation of shaft 12, since somewhere in the drive from this shaft to the shaft 17 there is an irreversible connection such as the worm and wheel arrangement shown in Fig. 2. During the printing and resetting operations, which takes only a very small instant of time, the meter is retarded somewhat due to the slipping friction in the drive from gear 21 to shaft 17, but this does not materially affect the accuracy of the device. The wheel 89 and the pointer 90 indicates the maximum of all of the actuations of the shaft 12. Every once in a while, such as once a month, the wheel 89 may be returned manually to zero position so that at the end of each month it indicates the maximum demand occurring in that month.

While I have shown in the accompanying drawings but one embodiment of my invention, I do not wish to be limited thereto, and I aim in the appended claims to embrace all modifications which fall within the spirit and scope of my invention.

What I claim as new and desire to secure by Letters Patent of the United States, is:

1. In an instrument having a movable member, means for printing a record of the movement of the member during equal intervals of time, comprising a platen, a type carrier actuated in accordance with the movement of the movable member, and mechanical means actuated by a constantly energized motor for causing the platen and type carrier to perform a printing operation periodically.

2. In an instrument having a movable member, means for printing a record of the movement of the member during equal intervals of time, comprising a platen, a type carrier actuated in accordance with the movement of the movable member, and a shaft therefor rotated periodically by a constantly energized motor and arranged to cause the platen and the type carrier to perform a printing operation.

3. In an instrument having a movable member, means for printing a record of the movement of the member during equal intervals of time, comprising a platen, a type carrier actuated in accordance with the movement of the movable member, a spring tending to urge said platen and type carrier together, and a mechanically driven cam for permitting said spring to act periodically and for separating the platen and the type carrier.

4. In a printometer, a printing platen, means for operating said platen periodically, comprising a constantly wound spring, a timing device for permitting the spring to unwind periodically, and means whereby the unwinding of the spring causes the platen to perform a printing operation and stores up energy for operating said timing device.

5. In an instrument having a movable member, means for printing a record of the movement of the member during equal intervals of time, comprising a platen, a type carrier actuated in accordance with the movement of the movable member, mechanical means for causing the platen and type carrier to perform a printing operation periodically, and means for returning the type carrier to its zero position.

6. In an instrument having a movable member, means for printing a record of the movement of the member during equal intervals of time, comprising a platen, a type carrier driven by the movable member, means for periodically causing the platen and the type carrier to perform a printing operation, and means for insuring that the type on the type carrier is centered with respect to the platen prior to the printing operation.

7. In an instrument having a movable member, means for printing a record of the movement of the member during equal intervals of time, comprising a platen, a type carrier driven by the movable member, means for periodically causing the platen and the type carrier to perform a printing operation, means for insuring that the type on the type carrier is centered with respect to the platen prior to the printing operation, and means for returning the type carrier to its zero position.

8. In an instrument having a movable member, means for printing a record of the movement of the member during equal intervals of time, comprising a platen, a type carrier, means for moving the type carrier in accordance with the movement of the movable member, a friction clutch through which said latter means operates, and means actuated periodically to move the type carrier back to its zero position, so arranged that this reverse movement is taken up by the friction clutch and is not transmitted to the movable member.

9. In an instrument having a movable member, means for printing a record of the movement of the member during equal intervals of time, comprising a platen, a type carrier, means for moving the type carrier in acordance with the movement of the movable member, a friction clutch through which said latter means operates, a toothed member having teeth of the same equivalent pitch as that of the sets of type on the type carrier and mechanically connected therewith and a detent cooperating with the teeth on the toothed member and periodically operated, whereby the type on the type carrier is centered prior to the printing operation.

10. In an instrument having a movable member, means for printing a record of the movement of the member during equal intervals of time, comprising a platen, a type carrier actuated in accordance with the movement of the movable member, a periodically actuated shaft, means operated by said shaft for first centering the type, then for causing the platen and type carrier to perform a printing operation, and lastly for returning the type carrier to its zero position.

11. In an instrument having a movable member, means for printing a record of the movement of the member during equal intervals of time, comprising a platen, a type carrier, means for actuating the type carrier in accordance with the movement of the movable member, a uniformly moved tape upon which the printing is performed, a toothed member having teeth of the same equivalent pitch as that of the sets of type on the type carrier and mechanically connected therewith, a shaft, a spring tending to rotate said shaft, means for periodically releasing the shaft whereby it may rotate to a limited extent, a cam actuated by said shaft for causing a printing operation, a second cam actuated by the shaft, a detent in operative relation to the second cam for causing engagement of the detent with the teeth of the toothed member whereby the type is centered, and a pair of friction wheels operated by the shaft for returning the type carrier to its zero position.

12. In an instrument having a movable member, means for printing a recording of the movement of the member during equal intervals of time, comprising a platen, a type carrier actuated in accordance with the movement of the member, a tape upon which the record is to be printed, a clock movement for advancing the tape, a shaft, actuating means for said shaft, means for periodically permitting said shaft to rotate a limited amount, means whereby said shaft causes the printing operation to be performed, and means whereby the rotation of the shaft winds up the clock movement.

13. In combination, a spring, a motor arranged to be constantly energized for winding up the spring, a clock movement, a second spring for actuating the clock movement, means operated by the clock movement for periodically allowing the first mentioned spring to unwind, and a pair of friction gears operated by the unwinding of the spring and arranged to wind the clock spring.

14. In a printing mechanism, a type carrier, a tape upon which the printing is to be performed, a support, a platen having a plurality of operative surfaces and carried by the support, means for performing the printing operation, and means for inking the operative surfaces of the platen in succession after each printing operation.

15. In a printing mechanism, a type carrier, a member having a surface upon which the printing is to be performed, a platen having a plurality of operative surfaces, a support for the platen, means for performing a series of printing operations, and means whereby successive surfaces of the platen are inked after each operation, and whereby the inked surfaces are used only after at least one printing operation has been performed subsequent to inking of the surface.

16. In a printing mechanism, a type carrier, a member having a surface upon which the printing is to be performed, a rotatably mounted platen having a plurality of active surfaces, a movable support in which the platen is mounted, means for moving said support periodically to perform a printing operation, a pad for inking the surfaces of the platen, and means for rotating the platen after each operation so as to ink the surfaces of the platen successively.

17. In a printing mechanism, a type carrier, a member having a surface upon which the printing is to be performed, a rotatably mounted platen having a plurality of active surfaces, a movable support in which the platen is mounted, means for moving said support periodically to perform a printing operation, a pad for inking the surfaces of the platen, a ratchet wheel mechanically connected to the platen, and a pawl so located that for each printing operation it turns the ratchet wheel, whereby the surfaces of the platen are successively inked by the pad.

18. In an instrument having a movable member, in combination, means for printing a record of the movable member during equal intervals of time, means for indicating the extent of the movement during any part of an interval, and means for indicating the maximum of the movements of the member.

In witness whereof, I have hereunto set my hand this 14 day of July, 1921.

CHESTER I. HALL.